(No Model.)

2 Sheets—Sheet 1.

R. L. ATKINSON.
TELEGRAPH REPEATER.

No. 464,001.

Patented Dec. 1, 1891.

WITNESSES:
Frank S. Ober
Edward A. Wagner

INVENTOR
Richard L. Atkinson
BY
Wm. A. Rosenbaum
ATTORNEY.

(No Model.) 2 Sheets—Sheet 2.

R. L. ATKINSON.
TELEGRAPH REPEATER.

No. 464,001. Patented Dec. 1, 1891.

WITNESSES:
Frank L. Ober
Edward A. Wagner

INVENTOR
Richard L. Atkinson
BY
Wm A. Rosenbaum
ATTORNEY.

UNITED STATES PATENT OFFICE.

RICHARD L. ATKINSON, OF DELAWARE TOWNSHIP, NEW JERSEY, ASSIGNOR TO JOHN D. TUSTIN, OF SAME PLACE.

TELEGRAPH-REPEATER.

SPECIFICATION forming part of Letters Patent No. 464,001, dated December 1, 1891.

Application filed March 27, 1891. Serial No. 386,632. (No model.)

*To all whom it may concern:*

Be it known that I, RICHARD L. ATKINSON, a citizen of the United States, residing in Delaware township, in the county of Camden and State of New Jersey, have invented certain new and useful Improvements in Telegraph-Repeaters, of which the following is a specification.

My invention relates to improvements in telegraphic repeaters, and is designed especially to cure a fault in the operation of the repeater described in United States Letters Patent No. 66,945, granted to Brownson and Shull July 23, 1867.

My invention consists in placing a single-point relay, or what is commonly known as a "bug-trap," in the cut-off circuits described in said patent.

Figure 1:
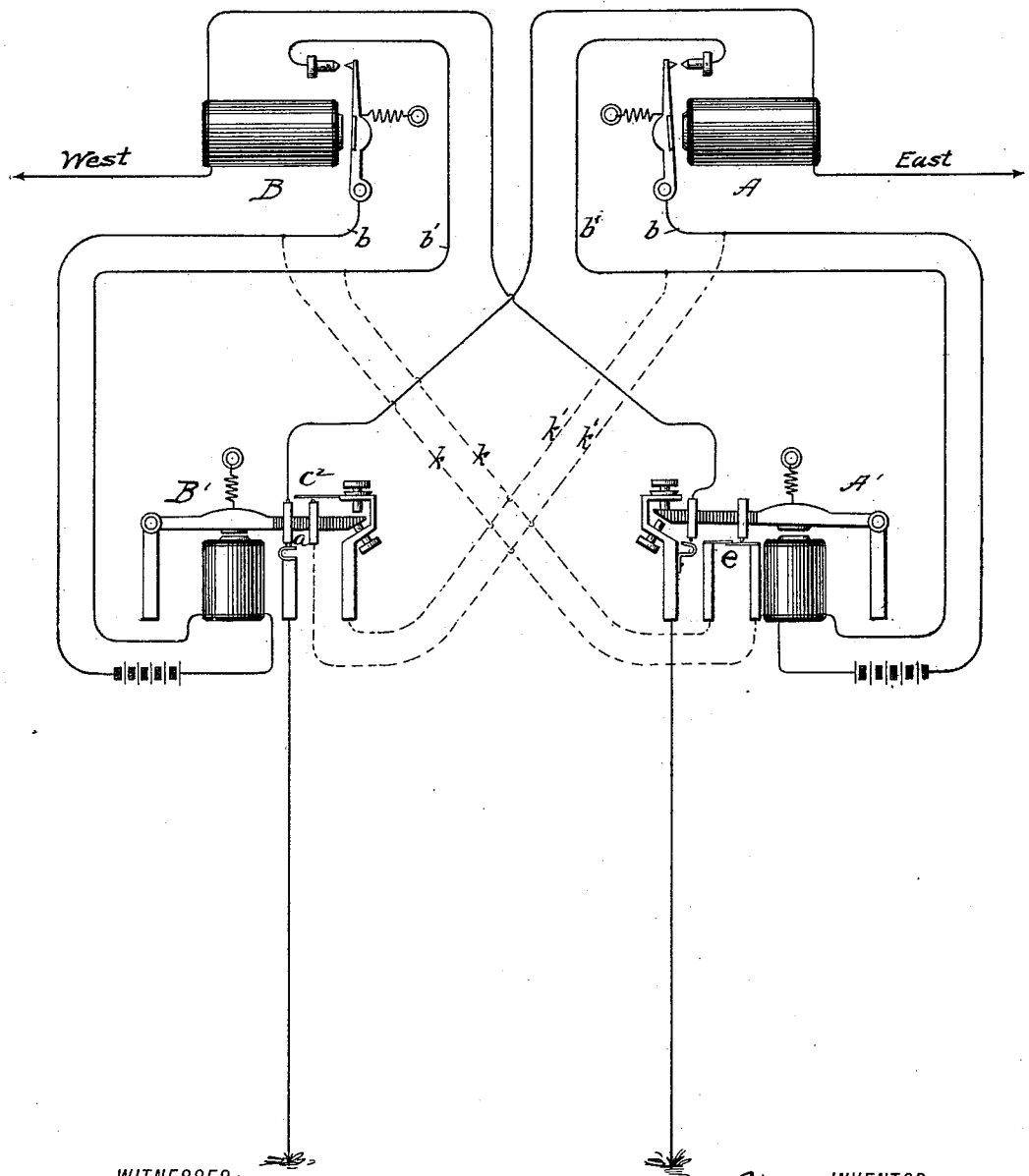
Figure 2:
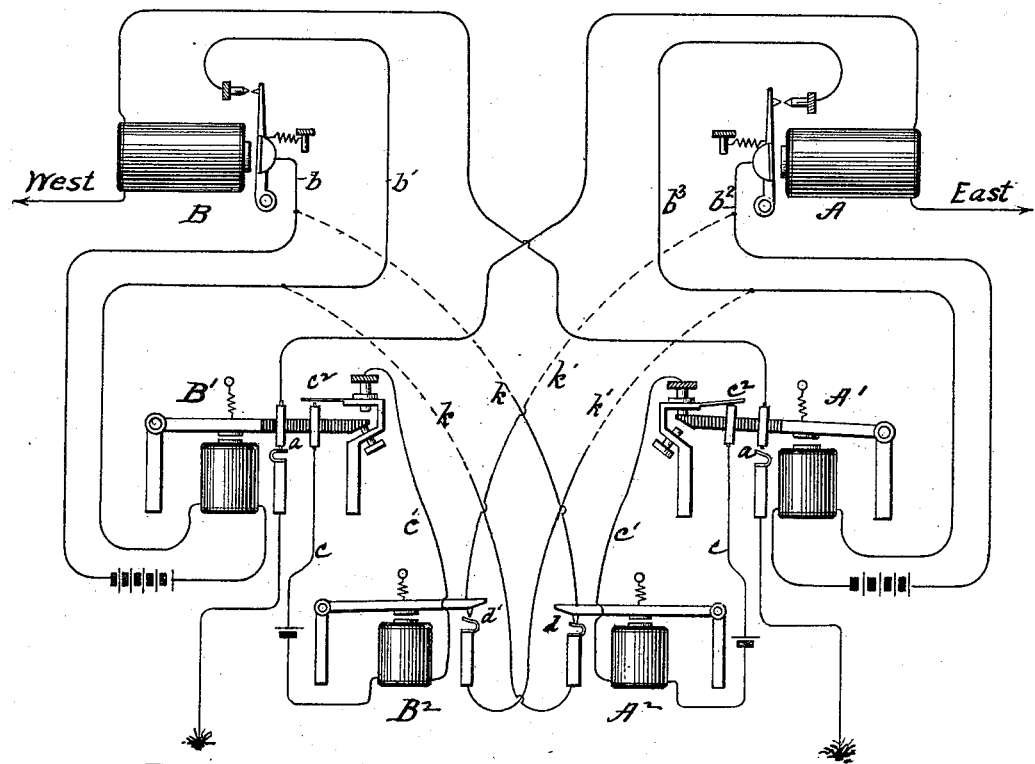
Figure 3:
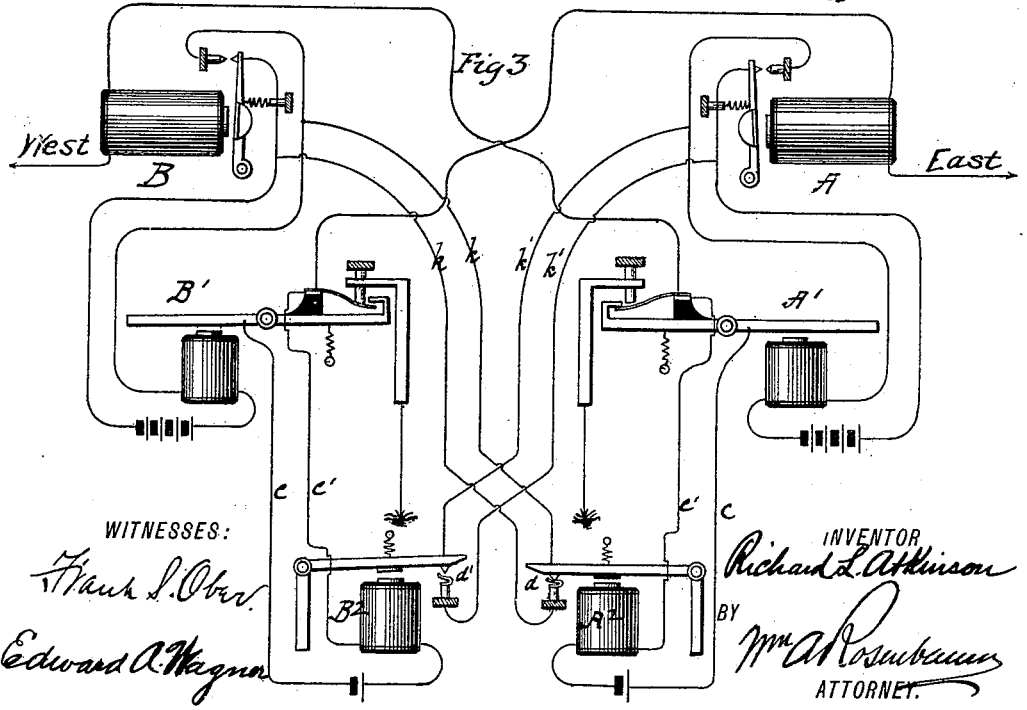

In the accompanying drawings, Figure 1 represents the apparatus and circuits shown in the said patent. Fig. 2 represents substantially the same with my improved apparatus added thereto. Fig. 3 represents the same as shown in Fig. 2, except that a single-current transmitter is substituted for the transmitter shown in Fig. 2.

Referring to Figs. 2 and 3 of the drawings by letter, A and B represent, respectively, the east and west relays. A' and B' respectively represent the east and west transmitters, whose circuits are controlled, respectively, by the relays. $A^2$ and $B^2$ represent single-point relays, whose magnets are in a circuit controlled, respectively, by the transmitters, and the points $d\ d'$, which these relays control, are the terminals, respectively, of what are termed in the said Letters Patent the "cut-off wires." In Fig. 2 these wires are represented by $k\ k$ and $k'\ k'$.

Referring to Fig. 2, the circuits are as follows: Main line east through relay A to points $a$ on transmitter B' to ground. This circuit is duplicated between relay B and transmitter A'. $b\ b'$ and $b^2\ b^3$ represent, respectively, the wires of the local circuits, including the transmitters, and controlled by the relays. $c\ c'$ represent the circuits of the single-point relays $A^2\ B^2$, which are controlled at the points $c^2$ by the transmitters. $k\ k$ and $k'\ k'$ represent, respectively, the two cut-off wires or derived circuits controlled, respectively, by the points of the relays $A^2$ and $B^2$ at $d\ d'$. These wires of each cut-off circuit are connected, respectively, with the wires of the two local circuits $b\ b'$ and $b^2\ b^3$, as shown.

I will now explain the operation of the patented repeater shown in Fig. 1 and then the operation of my repeater. In the drawing of the patented repeater the condition of the circuits is that when both lines are open. Suppose now that east closes. Relay A closes its local circuit, causing transmitter A' to close the circuit of west relay at the point $a$. Simultaneously the circuit of the cut-off wire $k\ k$ is opened at $e$. Now the function of this cut-off circuit $k\ k$ is to hold the circuit of the transmitter B' closed while the points of the west repeater are open, so that the east line may be complete at $a$. As soon, however, as the west relay-points are closed the circuit $k\ k$ may open and the transmitter B' will continue to be closed; but in the operation of this repeater it is found that, owing to the length of time which it requires to energize the receiving or, in this instance, the west relay and the additional time it requires for its armature to pass to its front stop, there is a short space of time when both the cut-off circuit $k\ k$ and the local circuit $b\ b'$ are open, and during this short time the transmitter B', being de-energized, makes a quick break at $a$ and causes a "kick" in the east relay A. This defect is particularly noticeable on long lines and where high adjustments are maintained. My invention cures this defect in the following manner: When the transmitter A' closes at $a$, it simultaneously breaks the circuit $c\ c'$ at $c^2$ and de-energizes the relay or bug-trap $A^2$. This de-energization of the bug-trap takes place, then, simultaneously with the energization of the west relay B, and as I construct the relays $A^2$ and $B^2$ so that they will act sluggishly, or even with the same speed as the main relays, the circuit $k\ k$ is not opened until the points of the relay B have had time to close, thus insuring that the local circuit $b\ b'$ and the east line are held closed. These bug-traps inserted in the cut-off circuits therefore act in the nature of cushions to delay the opening of the said cut-off circuits.

In Fig. 3 I have shown single-current transmitters in the place of those shown at A' and B' in Fig. 2. These are illustrated simply to show that any kind of an instrument which will open one circuit and close another simultaneously may be used in connection with my improved repeater.

Having thus described my invention, I claim—

1. In a telegraph-repeater, a local circuit, as $b\ b'$, and a cut-off or derived circuit, as $k\ k$, in combination with a main relay and a second relay, as $A^2$, the main relay controlling the local circuit and the second relay controlling the cut-off or derived circuit, and a second local circuit, as $b^2\ b^3$, including the instrument which controls the circuit of said second relay.

2. In a telegraph repeater, a local circuit, as $b\ b'$, and a cut-off or derived circuit, as $k\ k$, in combination with a main relay and a second relay, as $A^2$, the main relay controlling the local circuit and the second relay controlling the cut-off or derived circuit, and a second local circuit, as $b^2 b^3$, including the instrument which controls the circuit of said second relay and at the same operation controls the circuit of said main relay.

In witness whereof I have hereunto signed my name in the presence of two subscribing witnesses.

RICHARD L. ATKINSON.

Witnesses:
FRANK S. OBER,
WM. A. ROSENBAUM.